(12) United States Patent
Meguro

(10) Patent No.: US 6,198,598 B1
(45) Date of Patent: Mar. 6, 2001

(54) DISC CARTRIDGE WITH SLIPPERY FILM TO REDUCE FRICTION AND VENT TO DISCHARGE DUST

(75) Inventor: Hiroshi Meguro, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/089,266

(22) Filed: Jun. 3, 1998

(30) Foreign Application Priority Data

Jun. 6, 1997 (JP) ................................... 9-148771

(51) Int. Cl.⁷ ................................................ G11B 23/033
(52) U.S. Cl. ............................................ 360/133; 369/291
(58) Field of Search ............................. 360/133; 369/291

(56) References Cited

U.S. PATENT DOCUMENTS

| | | | |
|---|---|---|---|
| 4,814,926 | * | 3/1989 | Gulbrandsen ........................ 360/133 |
| 4,885,652 | * | 12/1989 | Leonard et al. ...................... 360/133 |
| 4,888,761 | * | 12/1989 | Ohta ..................................... 369/291 |
| 4,899,244 | * | 2/1990 | Morse ................................... 360/133 |
| 4,958,249 | * | 9/1990 | Kadokura et al. ................... 360/133 |
| 5,085,723 | * | 2/1992 | Nakaki et al. ........................ 156/250 |
| 5,179,487 | * | 1/1993 | Niitsuma et al. ..................... 360/133 |
| 5,241,441 | * | 8/1993 | Yamada et al. ....................... 360/133 |
| 5,247,416 | * | 9/1993 | Shiba et al. ........................... 360/133 |
| 5,282,106 | * | 1/1994 | Saito et al. ........................... 360/133 |
| 5,311,389 | * | 5/1994 | Howey ................................. 360/133 |
| 5,582,901 | * | 12/1996 | Howey et al. ........................ 428/198 |
| 5,587,860 | * | 12/1996 | Umebayashi et al. ............... 360/133 |
| 5,682,360 | * | 10/1997 | Oshima ................................. 369/13 |
| 5,773,137 | * | 6/1998 | Niitsuma et al. ..................... 428/323 |

* cited by examiner

*Primary Examiner*—Brian E. Miller
(74) *Attorney, Agent, or Firm*—Limbach & Limbach L.L.P.

(57) ABSTRACT

A disc cartridge includes a shell for storage of a recording medium taken in the form of a disc having a center core formed at the center thereof. The disc has signal recording portions formed around the center core on the opposite surfaces thereof. The shell has opposite inner surfaces facing to each other to define a disc receipt space containing the disc supported for rotation therein between the inner surfaces. The shell has a chucking hole through which the center core of the disc is exposed and read-write windows through which the respective signal recording portions are exposed. A shutter is mounted for sliding movement on the shell to open and close the read-write windows. A pair of slippery films are formed on the respective inner surfaces.

3 Claims, 11 Drawing Sheets

DISC CARTRIDGE WITH SLIPPERY FILM TO REDUCE FRICTION AND VENT TO DISCHARGE DUST

BACKGROUND OF THE INVENTION

This invention relates to a disc cartridge such as so-called floppy disc and, more particularly, to a disc cartridge designed to rotate at a high speed, for example, 3000 rpm or 3600 rpm, so as to increase its memory capacity.

Such a conventional disc cartridge includes first and second liners brought into soft pressure contact with its disc-shaped recording medium for arresting dust from the opposite side surface of the disc-shaped recording medium when it is placed in position on a disc drive unit. One of the problems associated with such a conventional disc cartridge is that the dust arrested on the first and second liners tends to damage the recording medium. This is true particularly in rotating the disc-shaped recording medium at a higher speed so as to increase its memory capacity. Secondly, when the disc-shaped recording medium is deformed for any of reasons, the disc-shaped recording medium will rotate with an increased amount of friction between the first and second liners. This may cause the drive unit to become inoperative.

SUMMARY OF THE INVENTION

It is a main object of the invention to provide an improved disc cartridge which is free from the problems associated with the conventional disc cartridge.

There is provided, in accordance with the invention, a disc cartridge comprising a disc having a center core formed at the center thereof, the disc having signal recording portions formed around the center core on the opposite surfaces thereof, a shell having opposite inner surfaces facing to each other to define a disc receipt space containing the disc supported for rotation therein between the inner surfaces, the shell having a chucking hole through which the center core of the disc is exposed and read-write windows through which the respective signal recording portions are exposed, a shutter mounted for sliding movement on the shell to open and close the read-write windows, and slippery films formed on the respective inner surfaces.

BRIEF DESCRIPTION OF THE DRAWINGS

This invention will be described in greater detail by reference to the following description taken in connection with the accompanying drawings, in which.

DETAILED DESCRIPTION OF THE INVENTION

Prior to the description of the preferred embodiments of the invention, the prior art disc cartridge of FIGS. 13 to 16 are briefly described in order to provide a basis for a better understanding of the difficulties attendant thereon.

Figure 13:
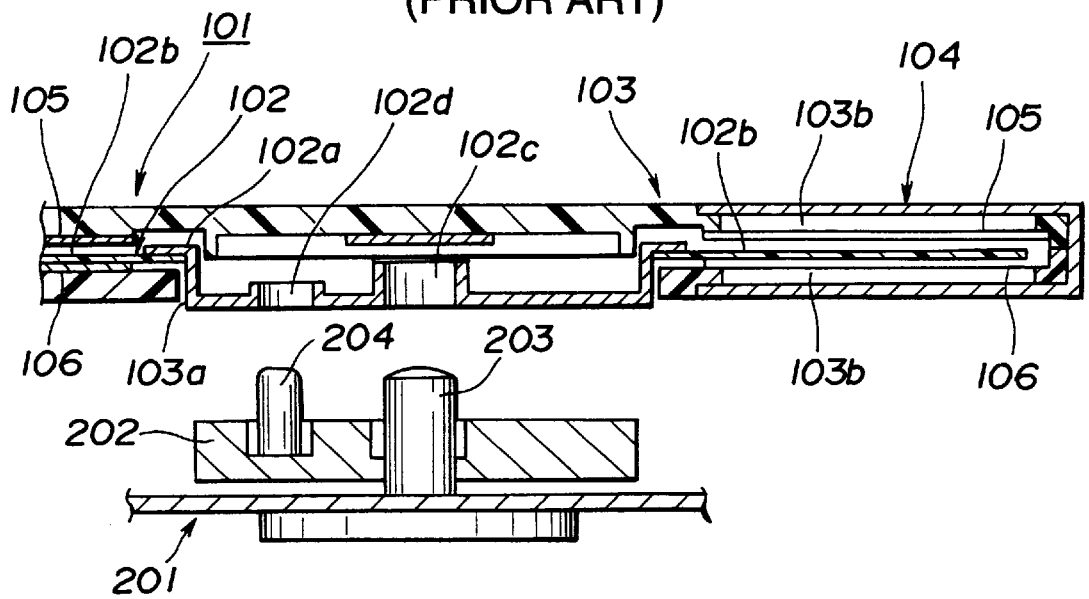
FIG. 13 is a sectional view showing the unused condition of a prior art disc cartridge.

FIG. 13 shows a conventional disc cartridge such as a 3.5 inch micro floppy disc (MFD). The conventional disc cartridge, generally designated by the numeral 101, includes a shell 103 for storage of a disc (magnetic sheet) 102 used as a recording medium. The disc 102 is supported for rotation within the shell 103. The disc 102 has a center core 102a extending through the chucking hole 103a of the shell 103 and a signal recording portion 102b exposed through a read-write window 103b formed in the shell 103. A shutter 104 is mounted for sliding movement on the shell 103 to open and close the read-record window 103b. The shell 103 has a first liner 105 mounted on the upper inner surface thereof and a second liner 106 mounted on the lower inner surface thereof. The first and second liners 105 and 106 are felt sheets (nonwoven fabric) formed in a ring shape.

The disc cartridge 101 is used with a drive unit 201 having a spindle (disc table) 202 provided thereon with a magnet (not shown), a spindle shaft 203 extending from the spindle 202 for engagement with a spindle shaft hole 102 formed in the center core 102a of the disc 102, and a chucking pin 204 extending from the spindle 202 for engagement with a chucking pin hole 102d formed in the center core 102a of the disc 102.

Figure 14:
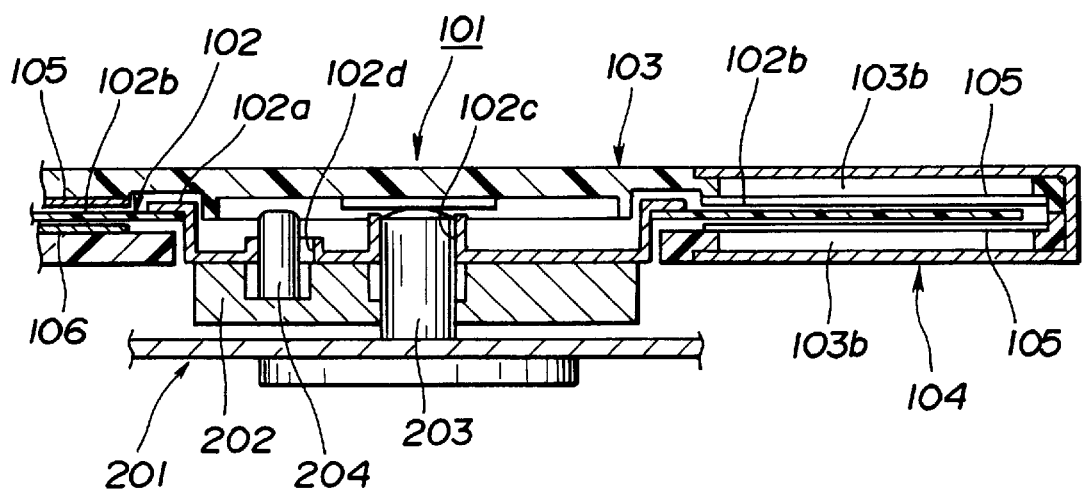
FIG. 14 is a sectional view showing the used condition of the prior art disc cartridge.
Figure 15:
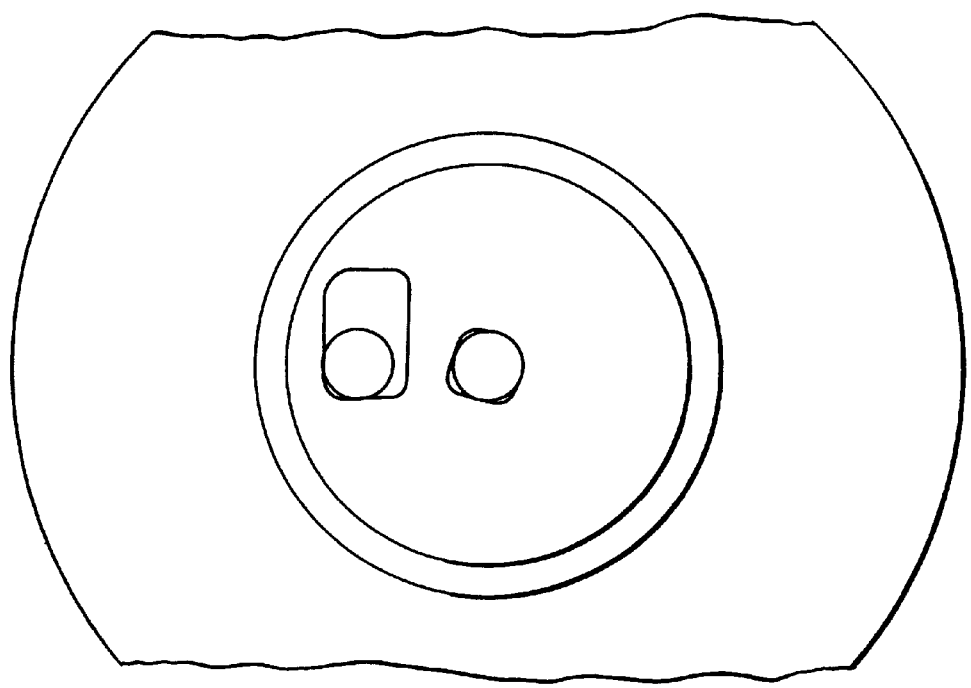
FIG. 15 is a plan view of the prior art disc cartridge.

To place the disc cartridge 101 in position on a drive unit 201, the disc cartridge 101 may be moved downward from a position, as shown in FIG. 13, to a chucking position, as shown in FIG. 14. In the course of movement toward the chucking position, the unshown magnet attracts the center core 102a of the disc 102 to ensure smooth placement of the disc cartridge 101 to the chucking position on the drive unit 201. In the chucking position, the spindle shaft 203 has its tip end placed in the spindle shaft insertion hole 102c of the center core 102a and the chucking pin 204 has its tip end placed in the chucking pin hole 102d of the center core 102a to chuck the disc cartridge 101 in position on the drive unit 201.

Figure 16:
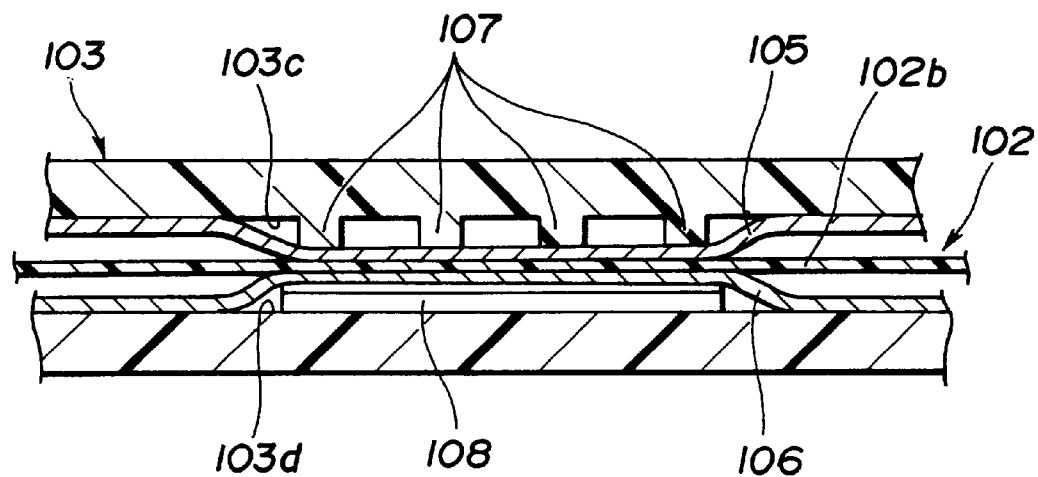
FIG. 16 is a sectional view showing a significant portion of the prior art disc cartridge.

As best shown in FIG. 16, the shell 103 is provided on its upper inner surface with ribs 107 to bring the first liner 105 partially into soft pressure contact with the upper surface of the signal recording portion 102b of the disc and also on its lower inner surface with a lifter 108 to bring the second liner 106 partially into soft pressure contact with the lower surface of the signal recording portion 102b of the disc. In this position, the first and second liners 105 and 106 serve to arrest dust from the upper and lower surfaces of the signal recording portion 102b of the disc 102.

With the conventional 3.5 inch micro floppy disc 101, however, the dust arrest on the first and second liners 105 and 106 would damage the disc 102. This is true particularly where the disc is rotated at a high speed to realize a great memory capacity. For example, the disc is rotated at 300 rpm for a memory capacity of 1 or 2 MB, at 360 rpm for a memory capacity of 4 MB, at 600 rpm for a memory capacity of 21 MB, at 720 rpm for a memory capacity of 120 MB (LS-120) and at 3000 rpm for a memory capacity of 100 MB (ZIP). The disc 102 will have its signal recording portion 102b damaged to a greater extent if the drive unit 201 is designed to rotate the disc 102 at a greater speed (for example, 3600 rpm) to realize a greater memory capacity.

Furthermore, if the shell 103 is deformed for any reason, the disc 102 will rotate with an increased amount of friction between the first and second liners 105 and 106. The increased amount of friction requires an increased drive torque to increase the load exerted on the spindle motor of the drive unit. This may cause malfunction.

Referring to FIGS. 1 to 6, there is shown a disc cartridge embodying the invention. The shown disc cartridge, generally designated by the numeral 1, is a 3.5 inch micro floppy disc and it is designed to provide a great memory capacity. The disc cartridge 1 includes a split molded plastic shell 3 comprised of upper and lower sections 31 and 32 made of thermoplastic resin and joined together at 34 by ultrasonic deposition or welding into the form of a flat casing having a disc receipt space 36 in which a disc (recording medium) is supported for rotation within the space 36. The shell 3 is formed in its peripheral side wall 33 with a vent 11 for air ventilation between its interior and exterior. The upper and lower sections 31 and 32 have depressed shutter slide areas 35 on the front side of the outer surfaces thereof. Each of the shutter slide areas 35 is formed with a read-write window 37. A shutter 4 is mounted on the shell 3 for sliding movement on the shutter slide areas 35 to open and close the vent 11 and also the read-write windows 37. The bold arrow A (FIG. 2) indicates the direction in which the disc cartridge is inserted into the drive unit. The disc 2 includes a magnetic sheet 21 having a magnetic recording portion. The magnetic sheet 21 is formed at its center with a core hole 22 in which a magnetic center core 24 is fixed by an adhesive 23. Each of the upper and lower sections 31 and 32 is formed on its inner surface with a circular rib 38 partially cut out at the position corresponding to the vent 11 to provide communication of the disc receipt space 36 with the vent 11.

The lower section 32 is formed at its center with a chucking hole 39 through which the lower end of the center core 24 is exposed when the disc 2 is contained in the disc receipt space 36. The magnetic recording portions provided on the opposite sides of the magnetic sheet 21 are exposed through the respective read-write window 37. The magnetic sheet 21 has its outer periphery surrounded by the circular ribs 38.

The shutter 4 is taken in a U-shaped form including upper and lower window cover plate portions 41 and 42 maintained in spaced-parallel relation to each other by a connector portion 43. The upper and lower window cover plate portions 41 and 42 are placed on the shutter slide areas formed on the outer surfaces of the respective sections 31 and 32. Each of the upper and lower window cover plate portions 41 and 42 is formed with a window 44 having a shape and size corresponding to those of the read-write windows 37. The read-write windows 37 open to expose the magnetic recording portions when the shutter 4 slides to a first position where the windows 44 come into alignment with the read-write windows 37. A coil spring 5 is provided to urge the shutter 4 toward a second position where it abuts on one end 36a of the shutter slide areas to close the read-write windows 37. At the second position, the connector portion 43 of the shutter 4 closes the vent 11 formed in the peripheral walls 33 of the shell 3.

Figure 7:
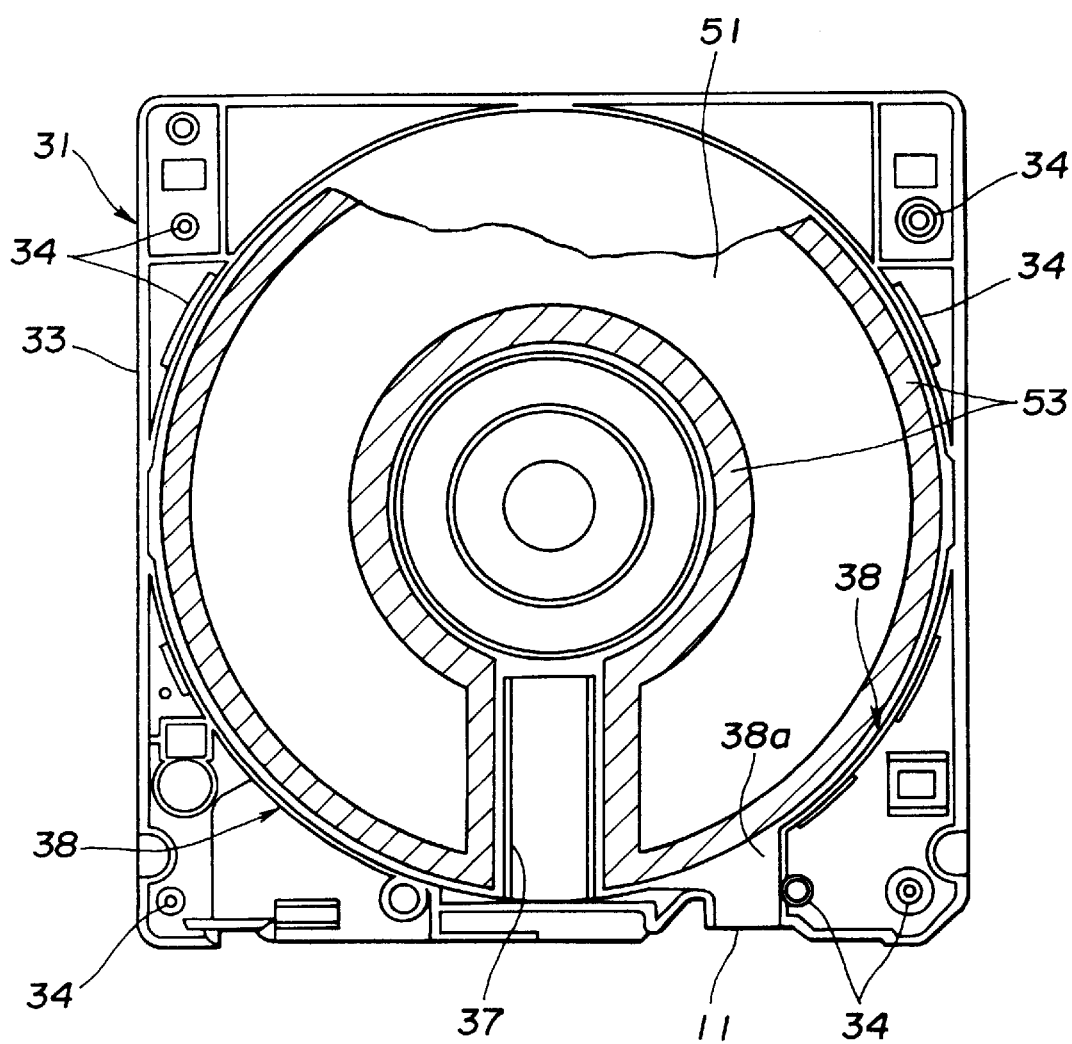
FIG. 7 is a fragmentary plan view showing one example of formation of the slippery films.
Figure 8:
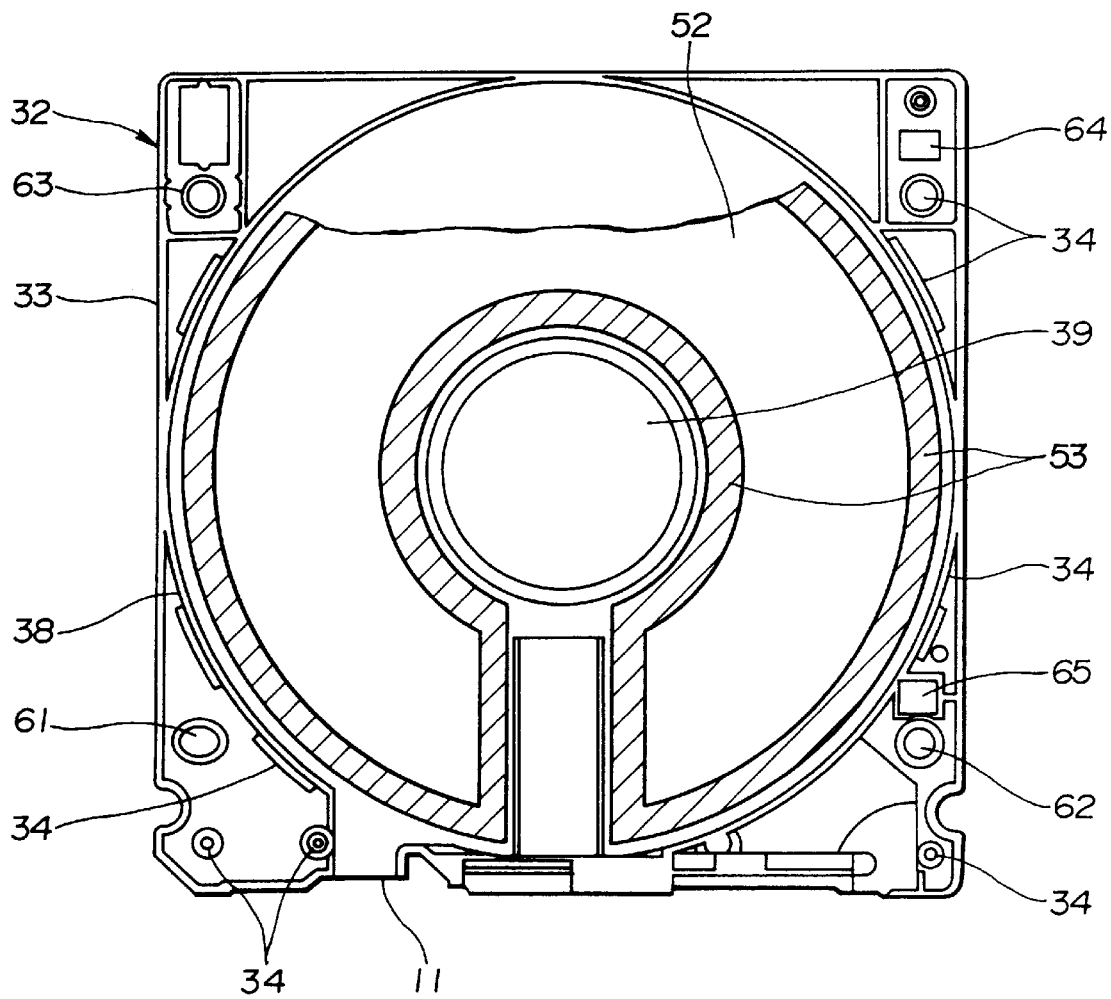
FIG. 8 is a fragmentary plan view showing another example of formation of the slippery films.
Figure 9:
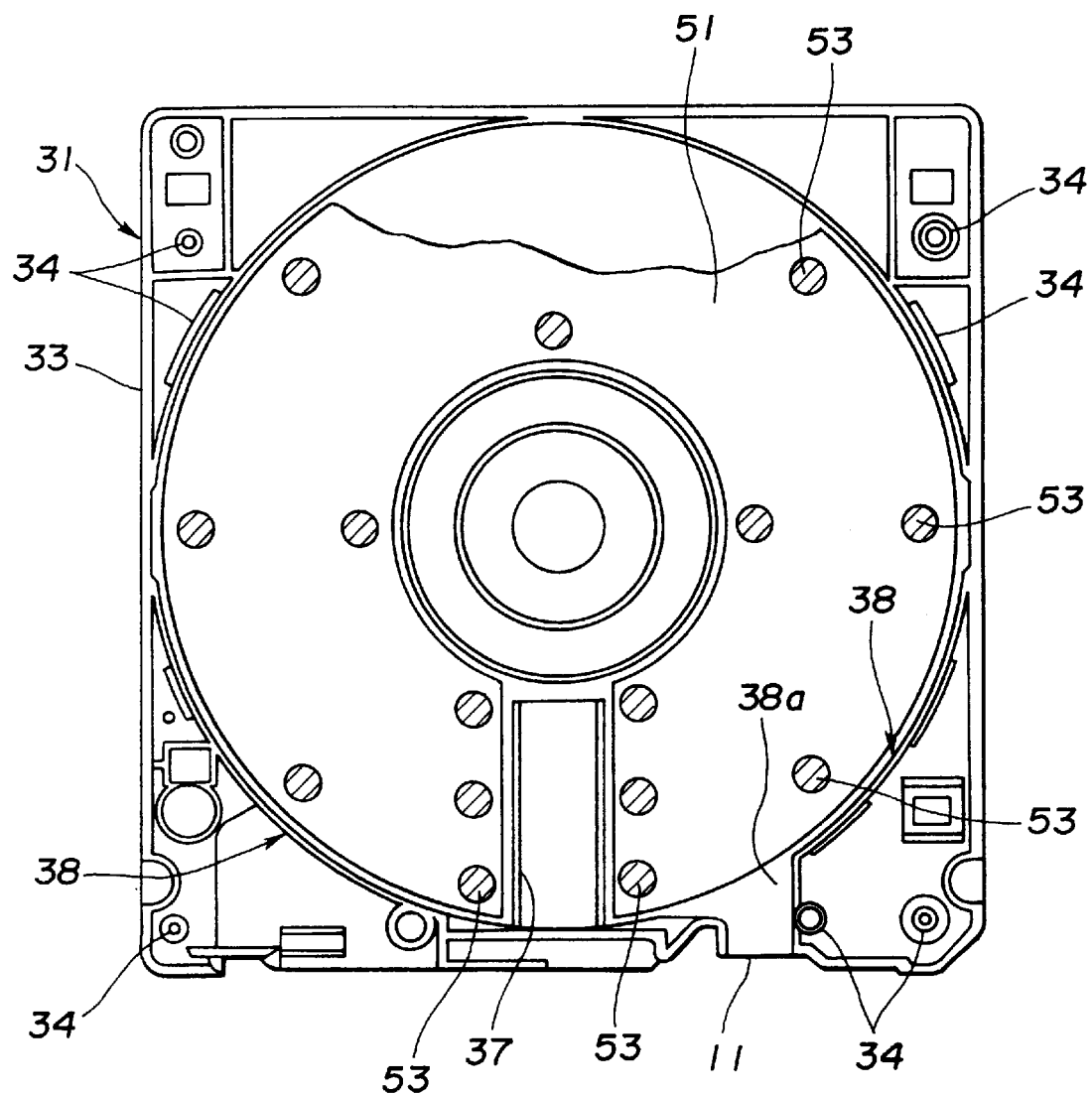
FIG. 9 is a fragmentary plan view showing another example of formation of the slippery films.
Figure 10:
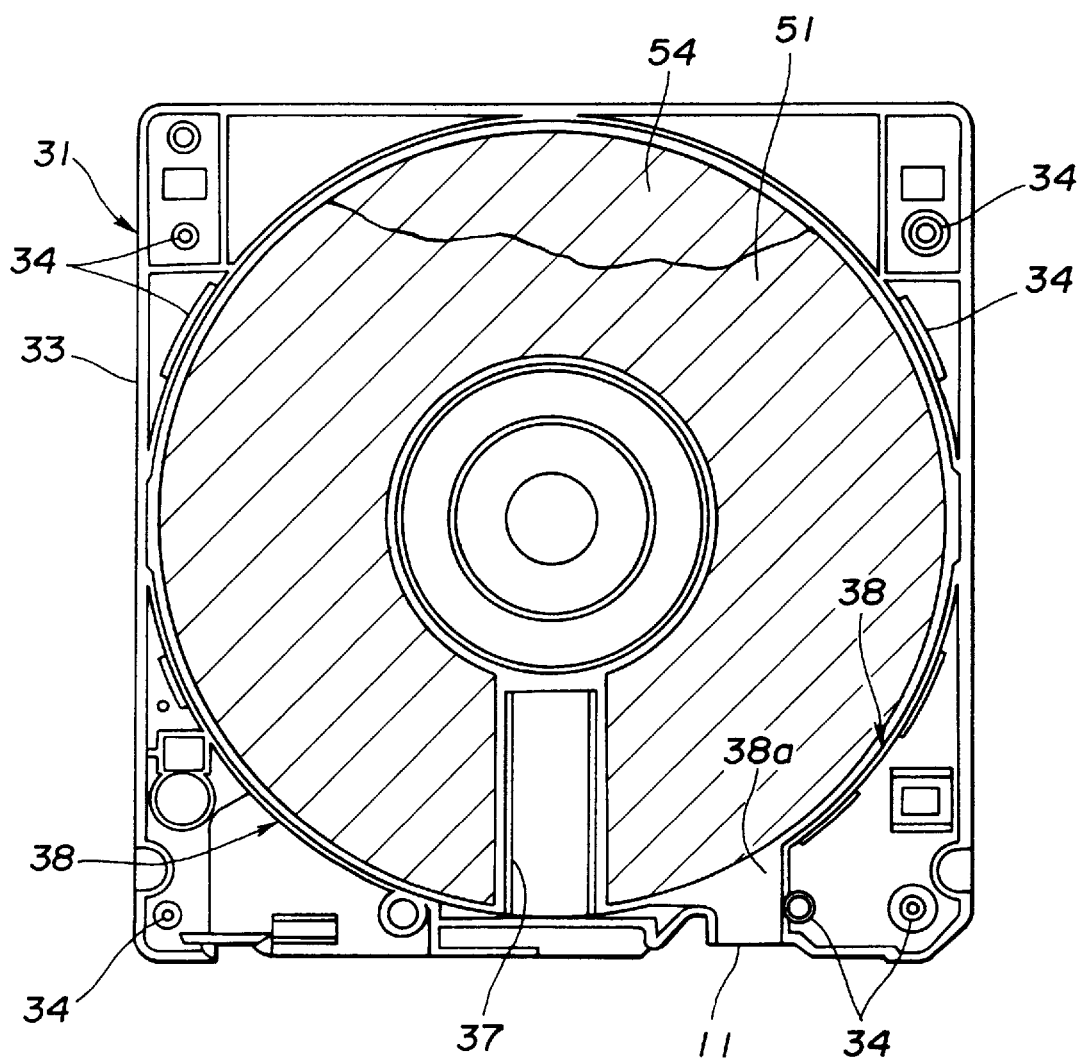
FIG. 10 is a fragmentary plan view showing still another example of formation of the slippery films.

The upper section 31 is provided on its inner surface with a slippery film 51 and the lower section 32 is provided on its inner surface with a slippery film 52. Each of the slippery films 51 and 52 is formed by bonding a slippery sheet on the inner surface of the corresponding one of the upper and lower sections 31 and 32. The slippery sheet may be made of ultra-high molecular polyethylene, slidable polyolefin, Si coated type polyethylene terephtarate (PET), polybutylene terephtarate (PBT, fluororesin or the like. The slippery sheet may be bonded to the inner surface of the corresponding one of the sections 31 and 32, through an ultrasonic or thermal deposition technique, by applying ultrasonic wave or heat to the peripheral portion of the slippery sheet, as shown in FIGS. 7 and 8 where the hatched area indicates the deposited portion or by applying ultrasonic wave or heat to points arranged on the peripheral portion of the slippery sheet, as shown in FIG. 9 where the hatched areas indicate the deposited points. Alternatively, the slippery sheet may be bonded to the inner surface of the corresponding one of the sections 31 and 32 with the use of a hot-melt adhesive such as rubber adhesive, synthetic resin adhesive and the like. In this case, the slippery sheet is placed on the inner surface of the corresponding one of the upper and lower sections 31 and 32 coated with the adhesive, as shown in FIG. 10 where the hatched area indicates the area coated with the adhesive. Preferably, the adhesive may be an ultraviolet radiation setting resin if the slippery sheet is made of a transparent material such as polyethylene terephtarate. Each of the slippery films 51 and 52 has a friction factor $\mu$ equal to or less than 0.2 and a surface resistivity equal to or less than $9 \times 10^{-12}$. It is known in the art that the tendency of occurrence of static electricity to adsorb dust is small if the surface resistivity is less than $10^{-13}$.

Figure 11:
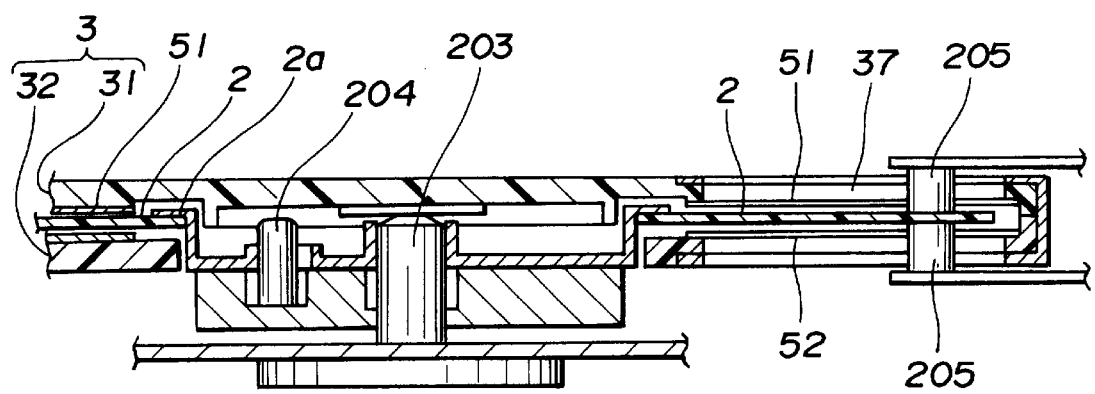
FIG. 11 is a sectional view showing the used condition of the disc cartridge.

In this embodiment, no comb-shaped ribs 107 (FIG. 16) is provided on the inner surfaces of the upper and lower sections 31 and 32. When the disc cartridge 1 is placed in position in the drive unit 201 with the disc 2 having its center core 24 chucked on the spindle 202, thus, the first and second liners 51 and 52 provided on the inner surface of the upper and lower sections 31 and 32 are held out of contact with the upper and lower surfaces of the magnetic sheet 21 of the disc 2, respectively, as shown in FIG. 11.

Returning to FIG. 5, the lower section 32 has first and second positioning holes (reference holes) 61 and 62 formed on the opposite sides near its front edge. The lower section 32 also has a slidable write protector 63 provided on one side near its rear edge and a capacity discrimination hole 64 formed on the other side near its rear edge. It is to be noted that the conventional disc cartridge has such a capacity discrimination hole on the one side and such a slidable write protector on the other side. If the disc cartridge of the invention is placed in the current drive unit, the current drive unit will recognize that it is inhibited to write data on the disc. It is, therefore, possible to prevent the current drive unit from writing data with the current format. A second capacity discrimination hole 65 is formed near the second positioning hole 62. The second capacity discrimination hole 65 is formed on a line extending between the centers of the second positioning hole 62 and the capacity discrimination hole 64.

Figure 12:
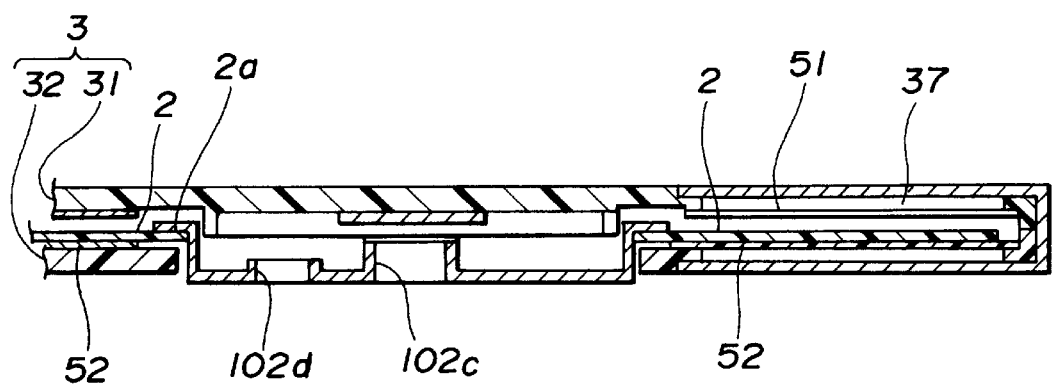
FIG. 12 is a sectional view showing the unused condition of the disc cartridge.

The operation of the disc cartridge of the invention will be described. When the disc cartridge 1 is not used, the magnetic sheet 21 of the disc 2 is placed on the slippery film formed on the inner surface of the lower section 32, as shown in FIG. 12. If an external force is exerted on the disc 2 under this condition, the magnetic sheet 21 smoothly moves on the slippery film 52 with almost no friction.

When the disc cartridge 1 is inserted into the drive unit, the shutter opening pin provided in the drive unit slides the shutter 4 against the resilient force of the coil spring 5 to open the read-write window 37 along with the vent 11. The disc cartridge 1 is placed in position within the drive unit, the disc cartridge 1 moves downward so that the center core 24 is chucked on the spindle 20 and the magnetic head 205 moves into contact with the upper and lower surfaces of the magnetic sheet 21, as shown in FIG. 11.

Figure 1:
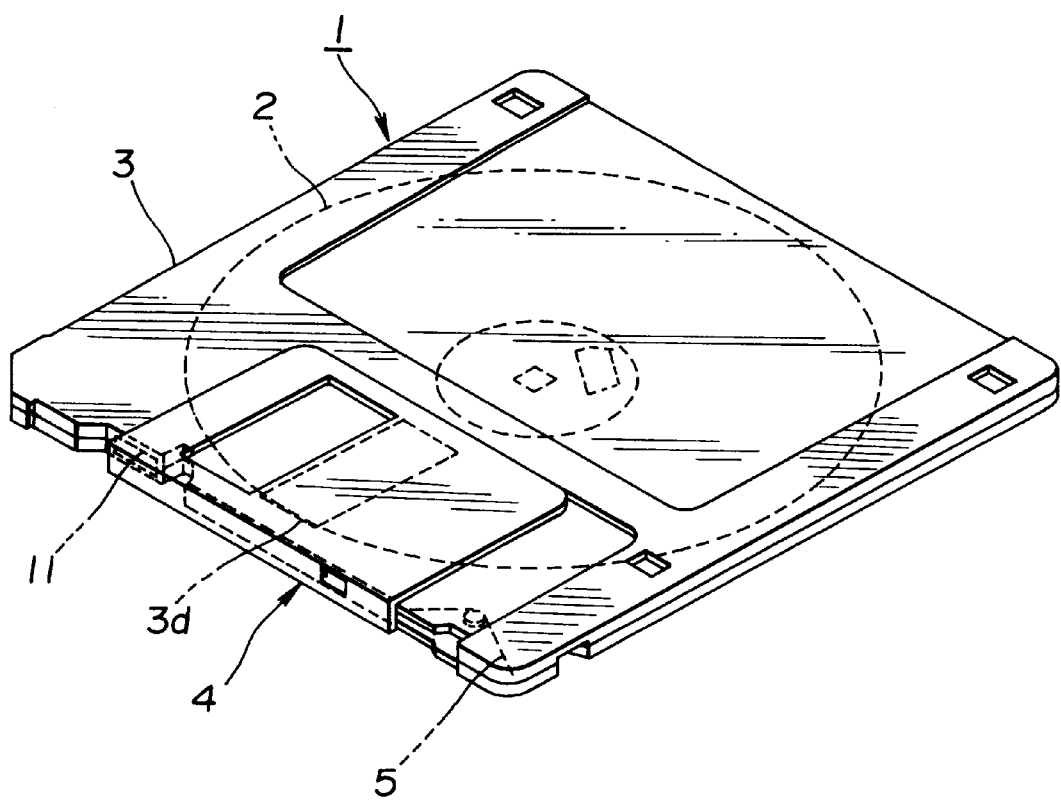
FIG. 1 is a perspective view showing one embodiment of a disc cartridge made in accordance with the invention.
Figure 2:
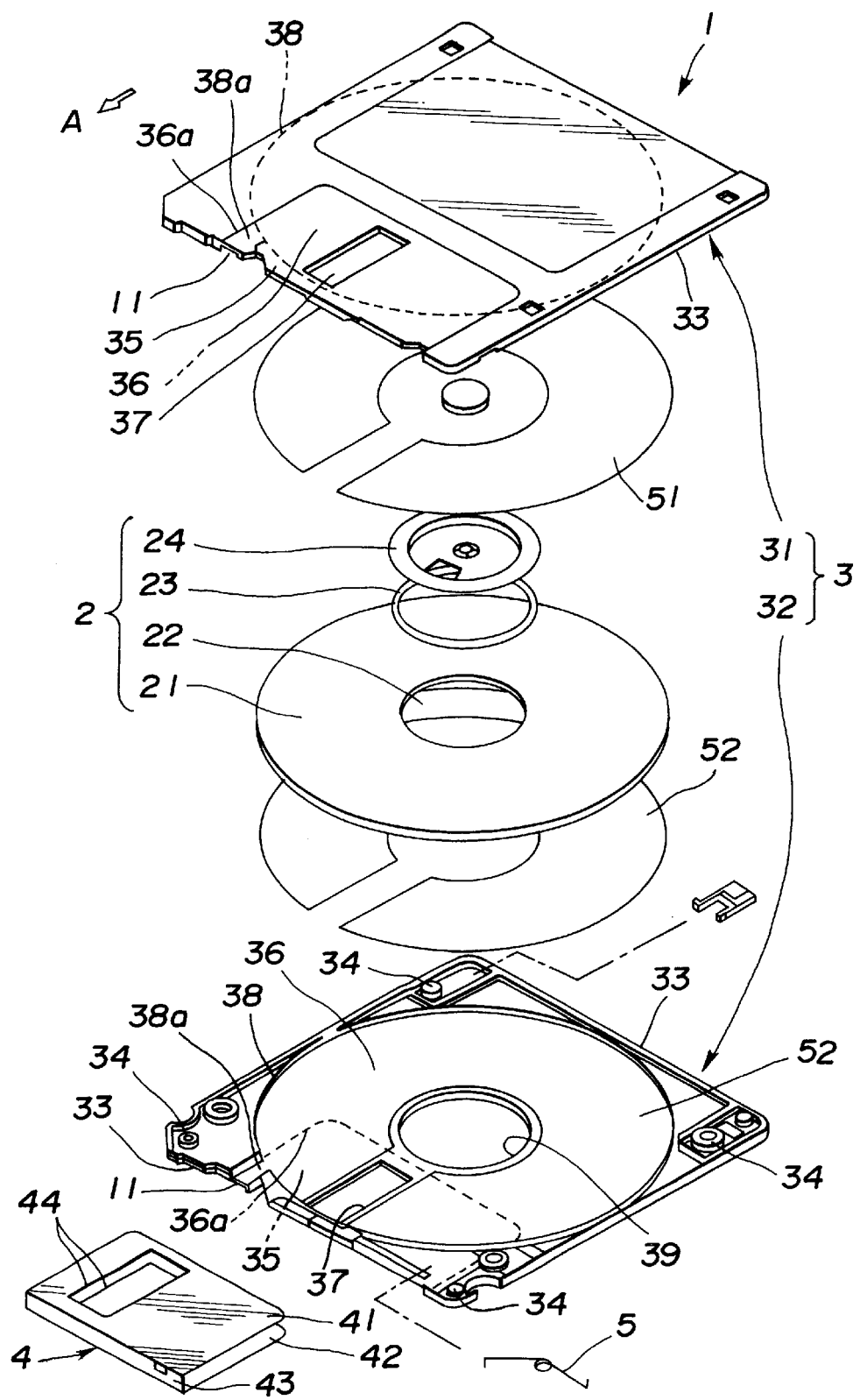
FIG. 2 is an exploded perspective view of the disc cartridge of FIG. 1.
Figure 3:
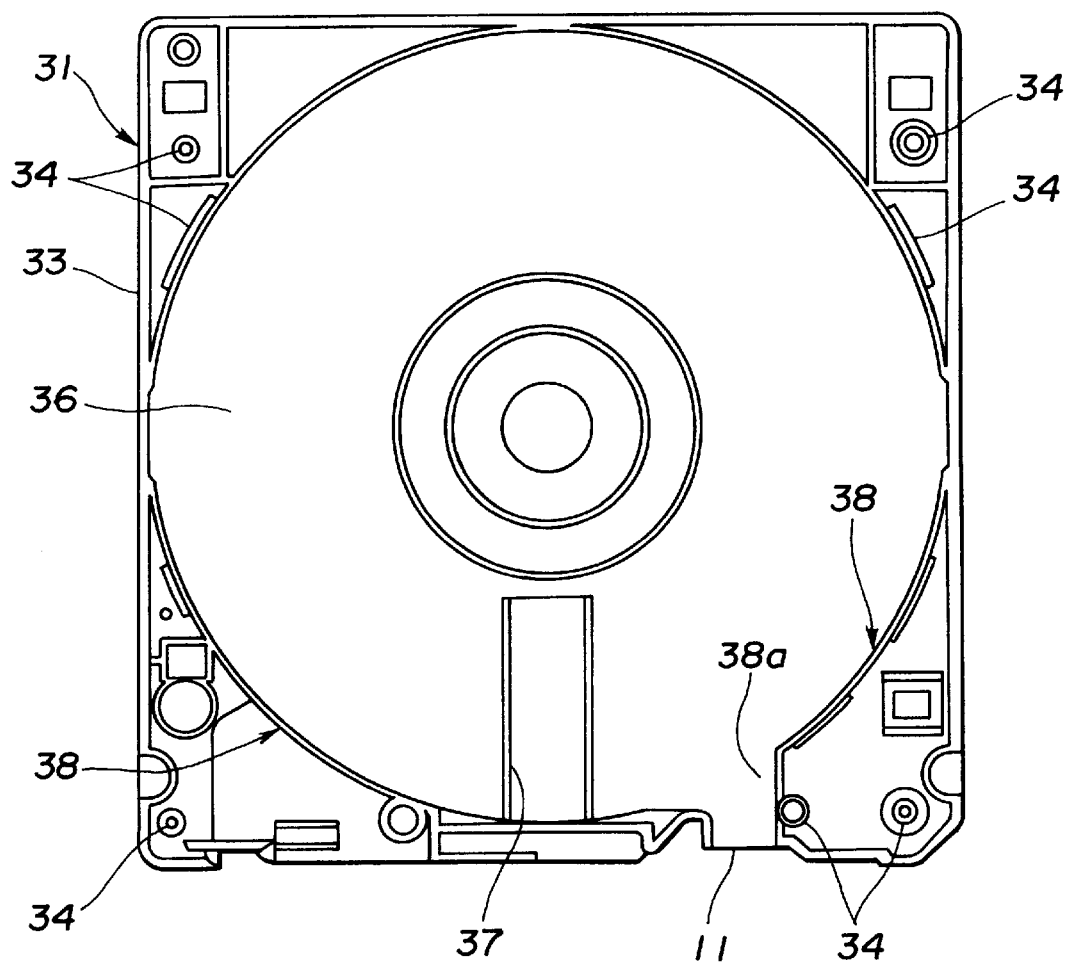
FIG. 3 is a plan view showing the inner side of the upper section of the disc cartridge of FIG. 1.
Figure 4:
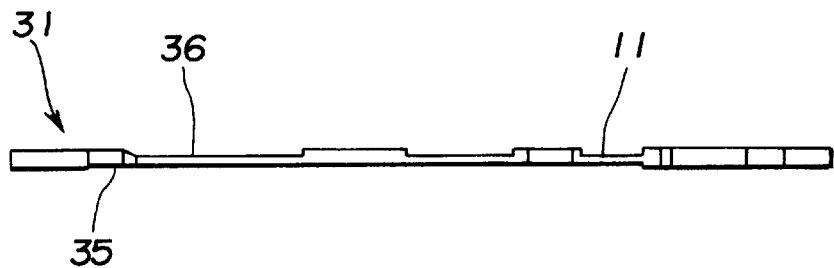
FIG. 4 is an elevational view of the upper section.
Figure 5:
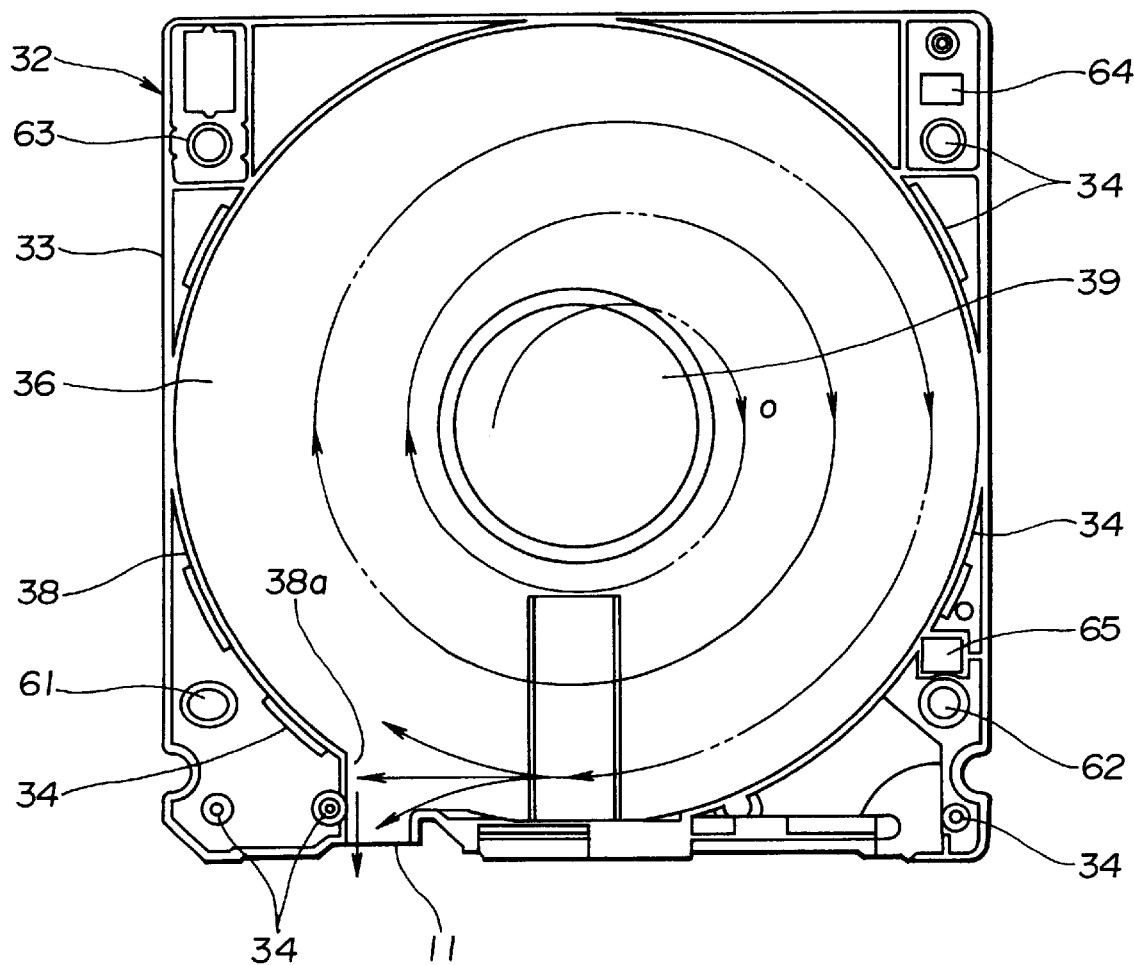
FIG. 5 is a plan view of the lower section of the disc cartridge of FIG. 1.
Figure 6:
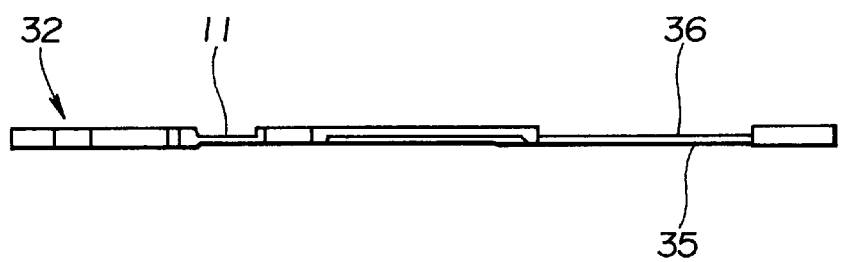
FIG. 6 is an elevational view of the lower section.

When the spindle 202 rotates the disc 2, a spiral air stream is produced within the shell 3, as indicated by the two-dotted line of FIG. 5, to blow dust away from the magnetic sheet 21 of the disc 2. The blown dust is discharged along with the air stream to the exterior through the vent 11 formed in the peripheral wall of the shell 3.

The dust blown with the rotation of the disc 2 abuts on the slippery films 51 and 52, the dust moves toward the vent 11 while sliding on the surface of the slippery films. It is, therefore, possible to ensure certain and easy dust discharge.

Even when the shell 3 or the magnetic sheet 21 is (i.e. warped) so that the spindle of the drive unit rotates the disc 2 at a high speed with the magnetic sheet 21 held in contact with the slippery films 51 and 52, the slippery films 51 and 52 ensure smooth rotation of the magnetic sheet 21 without almost no wear. It is, therefore, possible to protect the spindle motor from an excessive load exerted thereon.

Although the invention has been described in connection with the slippery films 51 and 52 formed by bonding slippery films on the inner surfaces of the upper and lower sections 31 and 32, respectively, it is to be understood that the slippery films 51 and 52 may be formed by coating a slippery agent on the inner surfaces of the upper and lower sections 31 and 32.

According to the invention, slippery films are formed on the respective inner surfaces held in spaced-parallel relation to each other to define a disc receipt space containing a disc-shaped recording medium supported for rotation therein between the inner surfaces. It is, therefore, possible to rotate the disc with almost no friction so as to minimize drive torque increases even when the disc has its opposite surfaces brought into contact with the slippery films formed on the inner surface of the shell because of deformation of the disc or the shell. Since the slippery films cannot arrest dust from the opposite surfaces of the disc, no possibility exists that the disc surfaces are damaged by the arrested dust.

Preferably, each of the slippery films includes a slippery sheet made of synthetic resin and bonded to the corresponding one of the inner surfaces of the shell. The slippery sheet has a thickness equal to or less than 0.4 mm. It is, therefore, possible to form slippery films having a uniform thickness over their whole areas with ease. This is effective to maintain a constant clearance between each of the slippery films and the corresponding one of the disc surfaces.

Preferably, the slippery films are held out of contact from the disc when the center core is chucked on a center core of a drive unit. It is, therefore, possible to eliminate the danger of disc wear and drive torque changes.

Preferably, the slippery films have a surface resistivity equal to or less than $9 \times 10^{-12}$. It is, therefore, possible to minimize static electricity production and dust absorption caused in the present of static electricity.

Preferably, the shell has a vent through which dust is discharged, along with air, to the exterior from the disc receipt space. The dust blown with rotation of the disc is discharged, along with an air stream, through the vent formed in the shell to the exterior.

What is claimed is:

1. A disc cartridge, comprising:

a disc having a center core formed at the center thereof, the disc having signal recording portions formed around the center core on opposite surfaces of the disc;

shell having opposite inner surfaces facing to each other to define a disc receipt space containing the disc supported for rotation therein between the inner surfaces, the shell having a chucking hole through which the center core of the disc is exposed and read-write windows through which the respective signal recording portions are exposed;

a shutter mounted for sliding movement on the shell to open and close the read-write windows;

at least one slippery film formed on each respective inner surface, wherein each of the at least one slippery film has a surface resistivity equal to or less than $9 \times 10^{-12}$ and greater than or equal to $10^{-13}$; and a vent through which dust is discharged, along with air, to the exterior from the disc receipt space.

2. The disc cartridge as claimed in claim 1, wherein each of the slippery films includes a slippery sheet made of synthetic resin and bonded to the corresponding one of the inner surfaces of the shell, the slippery sheet having a thickness equal to or less than 0.4 mm.

3. The disc cartridge as claimed in claim 1, wherein each of the at least one slippery film is held out of contact from the disc when the center core is chucked on a center core of a drive unit.

* * * * *

UNITED STATES PATENT AND TRADEMARK OFFICE
CERTIFICATE OF CORRECTION

PATENT NO. : 6,198,598 B1
DATED : March 6, 2001
INVENTOR(S) : Hiroshi Meguro

It is certified that error appears in the above-identified patent and that said Letters Patent is hereby corrected as shown below:

Column 4,
Line 12, delete "(PBT" and insert in its place -- (PBT) --.

Column 5,
Line 22, delete "is (i.e." and insert in its place -- is curved (i.e., --.

Signed and Sealed this

Twelfth Day of March, 2002

Attest:

JAMES E. ROGAN
Attesting Officer
Director of the United States Patent and Trademark Office